Patented July 29, 1947

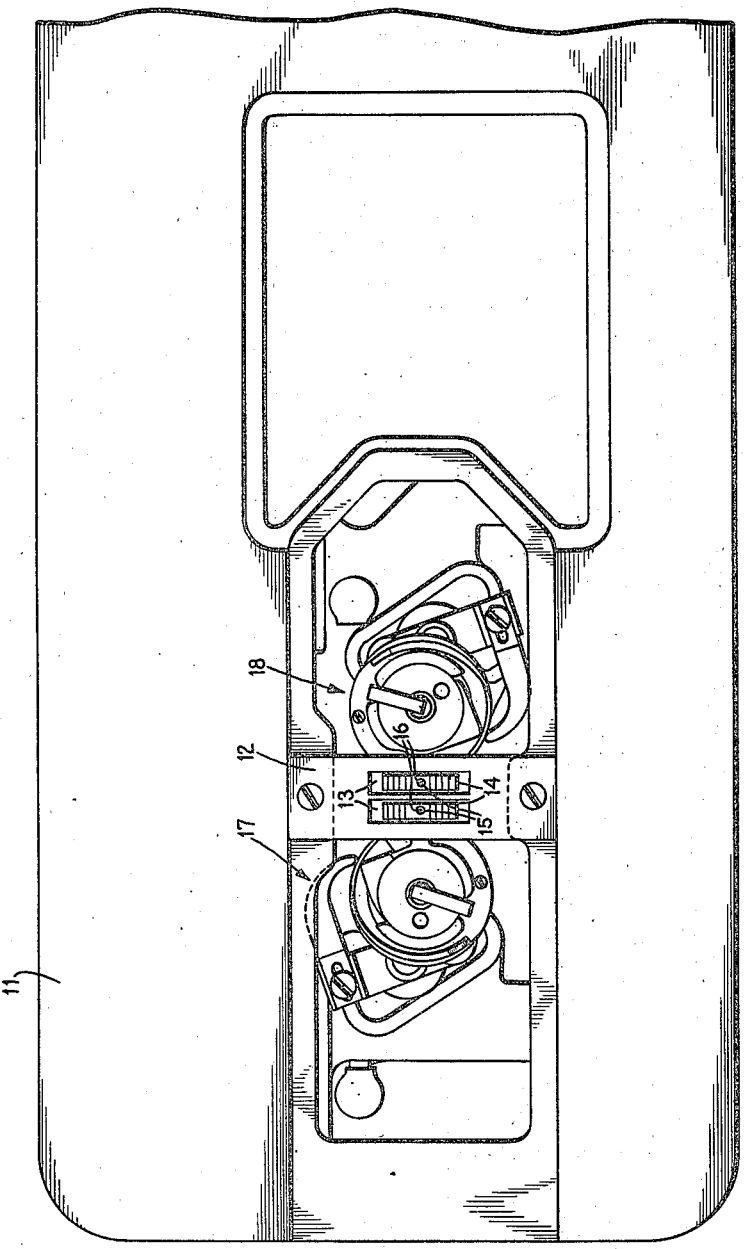

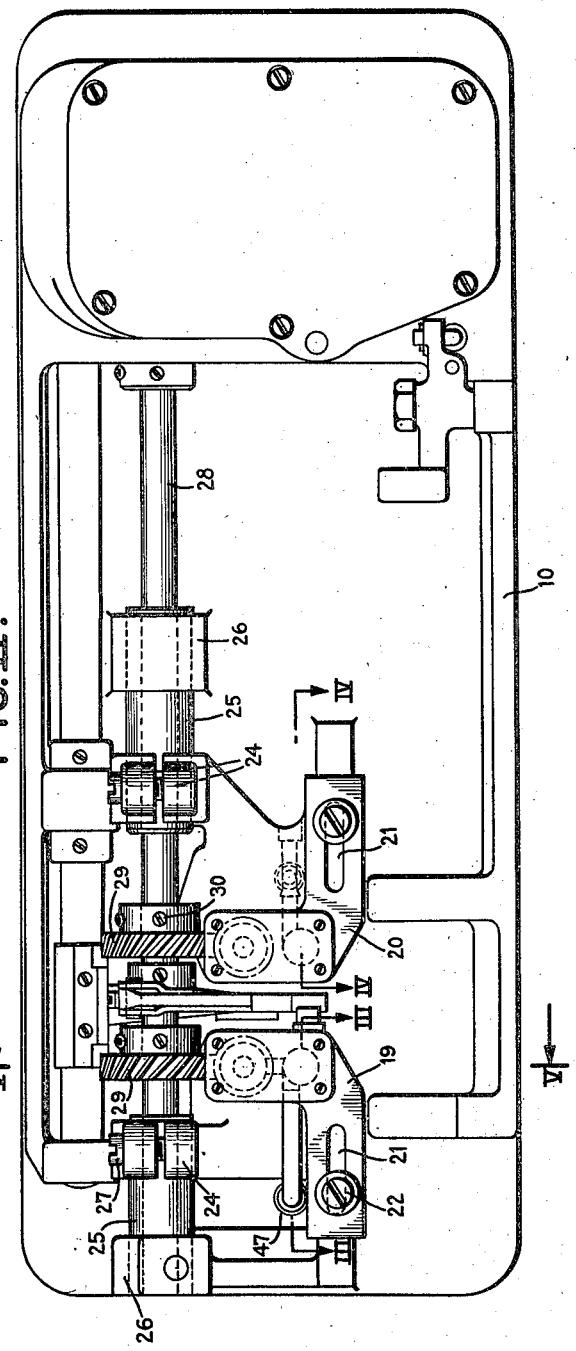

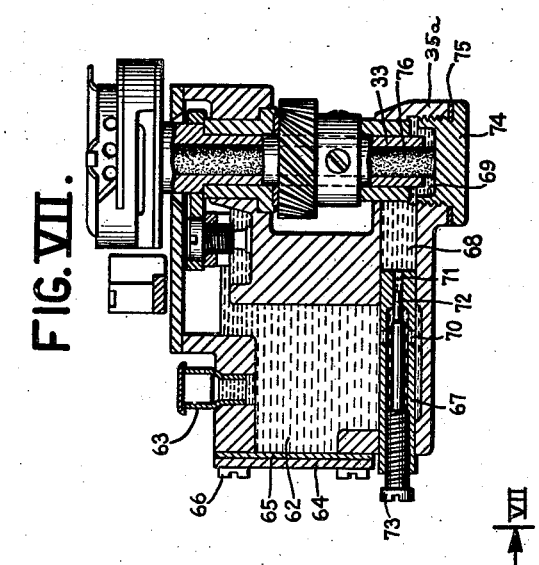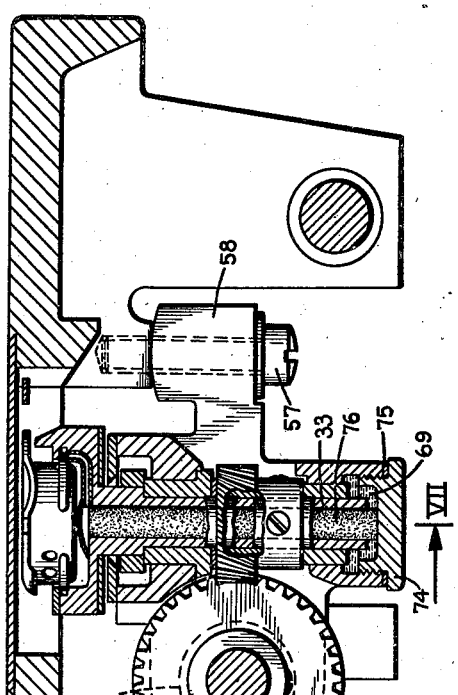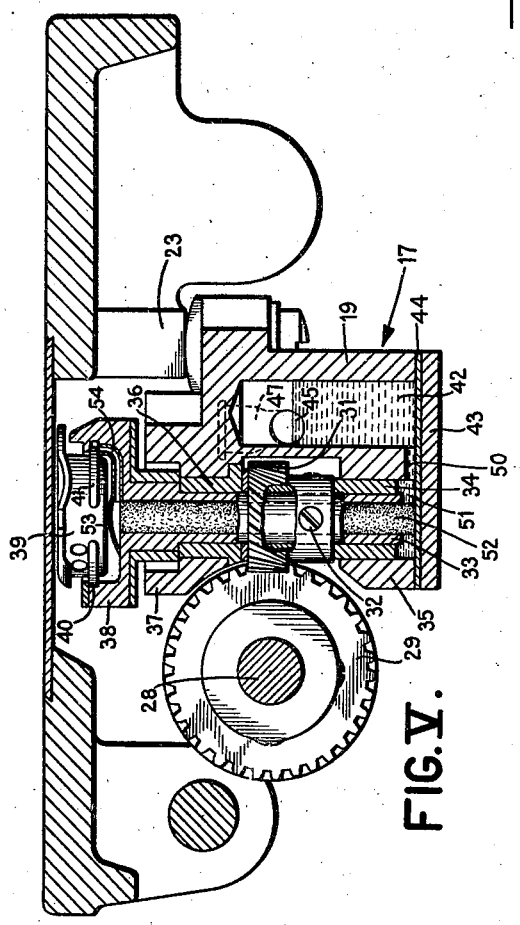

2,424,798

UNITED STATES PATENT OFFICE 2,424,798

SEWING MACHINE

Norman V. Christensen, Chicago, Ill., assignor to Union Special Machine Company, Chicago, Ill., a corporation of Illinois Application May 12, 1942, Serial No. 442,709

1 Claim. (Cl. 112—256)

This invention relates to improved lubricating devices for sewing machines and particularly for lock stitch machines having one or more vertically disposed rotary hooks.

In machines of the character specified a problem is presented in the way of supplying adequate lubricant to the bearing surfaces between the stationary and rotary components of the hook, particularly when the machine is operated more or less continuously at high speeds. If insufficient lubricant is supplied the hook will become overheated with attendant objectionable results. On the other hand, if an excessive amount of lubricant is fed to the hook raceway there is danger of soiling the goods or at least the sewing threads.

An important object of the present invention has been to insure the delivery of the proper amount of lubricant to the raceway of a hook having its axis vertically disposed.

Another object has been to provide a reservoir of substantial capacity within the frame of the machine from which the lubricant is fed at an appropriate rate to the hook raceway. A particular feature, in this connection, is the provision of a special reservoir for the hook raceway lubricant which permits the use of just the right type of lubricant for the purpose. Another feature is the mounting or formation of the reservoir on the saddle or frame of the hook. This is particularly advantageous in machines having multiple hooks since it permits the hooks and their entire lubrication systems to be adjusted on the machine frame for proper cooperation with the needles. However, the formation of the hook and its lubricating system, as a unitary structure, is advantageous also for use in single needle and single hook machines. Thus, a single construction is adapted to be readily varied to suit different requirements as to the spacing of the several lines of stitching, or the provision of either a right hand or left hand hook assembly in a single hook machine, and other similar variations. Proper hook lubrication is insured under all conditions. The machine thus lends itself to large scale and economical production.

Other features, objects and advantages of the invention will appear from the detailed description of an illustrative form of the same which will now be given in conjunction with the accompanying drawings, in which:

Fig. I is a top plan view of a portion of the base of a machine embodying the invention, portions of the work supporting surface being removed to show the construction beneath.

Fig. II is a bottom plan view of the base portion of the machine on a somewhat smaller scale.

Fig. III is a vertical sectional view along the line III—III of Fig. II showing a detail.

Fig. IV is a vertical sectional view along the line IV—IV of Fig. II, showing a detail.

Fig. V is a transverse vertical section along the line V—V of Fig. II.

Fig. VI is a view similar to Fig. V showing a modified construction, and

Fig. VII is a vertical section along the line VII—VII of Fig. VI.

Referring now to the drawings, the invention is shown applied to a flat bed, lock stitch machine equipped with a pair of vertical axis rotary hook units, to be hereinafter more fully described. The construction illustrated in Figs. I to V, inclusive, is similar in many respects to that shown and described in the application of Norman V. Christensen and George Sauer, Ser. No. 364,382, filed November 5, 1940. For a fuller disclosure of certain details of the construction, reference may be had to said pending application.

The machine embodies a base portion 10 (Fig. II) having a work supporting surface 11 (Fig. I). A throat-plate 12 fitting into a recess in the base and forming part of the work supporting surface is provided with a pair of elongated openings 13 through which sections 14 of a feed dog of conventional construction are adapted to project and cooperate with the work in advancing the same. Any suitable means may be employed for imparting a four-motion operation to the feed dog. As will be understood, the machine is provided with the usual overhanging arm, which carries at its end a needle head with a vertically reciprocable needle bar and a presser bar of any suitable construction. Needles 15 carried by the needle bar are adapted to pass through apertures 16 in the feed dog sections and cooperate beneath the latter with complementary stitch-forming devices in the form of rotary hooks 17 and 18. The means for supplying power to the needle bar, the rotary hooks and the feed dog to operate the same in properly co-ordinated relation may be of any suitable and known construction.

Each hook unit comprises an auxiliary frame, that for the unit 17 being designated 19 and that for the unit 18 being designated 20. These frames are of right and lefthand construction and may differ slightly in other respects to adapt them for the available space within the main frame. Each of the auxiliary frames is provided with an elongated slot 21 adapted to receive a clamping screw 22 by which the auxiliary frame is adapted to be adjustably secured to a downwardly extending portion 23 of the main frame. Each of the auxiliary frames is also provided with a forked extension 24 adapted to surround a bearing sleeve 25 carried by a depending lug 26 on the main frame. A clamping screw 27 serves to retain the forked extension 24 in any selected position of adjustment along the sleeve 25. It will be seen that the foregoing construction enables the positioning of the two hook elements closer together or further apart, as desired, depending upon the spacing of the two lines of stitching to be formed. Or in a single needle machine the proper adjustment of the hook unit to the needle is facilitated. Thus, the same construction is adapted for a variety of different purposes by simply selecting appropriate needle holders and feed dogs and by setting the hook frame or frames in positions to cooperate properly with the needle or needles.

Power is delivered to the hook elements by means of a shaft 28 which may be connected with the source of power in the manner disclosed in the application of Oscar Quist, Ser. No. 326,828, filed March 30, 1940, and now matured into Patent No. 2,329,484 dated September 14, 1943. Shaft 28 is journaled within the bearing sleeves 25. Spiral gears 29 are secured to the shaft 28 for rotation therewith by means of setscrews 30 passing through the hubs of the gears. This construction is such that the relative positions of the gears may be varied readily to conform with the positioning of the hook frames.

In general the construction of the two rotary hooks is so similar that a description of one will suffice for both. Referring now to Fig. V, in which the hook unit 17 is illustrated, the spiral gear 29 meshes with a spiral pinion 31 secured by a set-screw 32 to a hollow shaft 33. Gear 29 has twice as many teeth as pinion 31 and, therefore, is adapted to rotate the latter and the shaft 33 at twice the angular speed of the shaft 28, which makes one revolution for each cycle of the machine. The shaft 33 is journaled adjacent its lower end in a bushing 34 having a tight fit within an opening in an extension 35 of the auxiliary frame 19. Above the pinion 31 the shaft 33 is journaled in a bushing 36 fitted within an opening in an extension 37 of the auxiliary frame. At its upper end the shaft 33 has integrally connected therewith, or otherwise secured thereto, a rotating component 38 of the rotary hook. Within this rotating component is the stationary component 39 forming a bobbin case to receive the usual thread-carrying bobbin. A raceway 40 is provided in the conventional manner between the rotating and stationary component of the hook. For details as to the formation of this raceway and the cooperating rib 41 on the bobbin case, reference may be had to said pending Christensen et al. application.

Within the auxiliary frame 19 there is formed a chamber 42 constituting a lubricant reservoir. This chamber and the lower end of the extension 35 of the frame is closed by a removable plate 43 and a gasket 44, these being secured in any suitable way, as by means of the screws indicated in Fig. II. For the purpose of introducing a lubricant into the reservoir 42, an inlet opening 45 is provided in the wall of the same and this is connected by a tube or pipe 46 with a cup 47 which is readily accessible beneath the work supporting surface and adapted to be closed by a spring cap 48. An oil strainer 49 may be provided in the cup, if desired. At its lower end the reservoir 42 is connected by a passage 50 with a space 51 provided beneath the bushing 34 and the lower end of shaft 33, this space forming an extension or part of the reservoir.

Within the hollow shaft 33 there is provided a wick 52 which extends into the portion 51 of the oil reservoir and extends upwardly through the shaft to the top of the base or web portion of the rotary component 38 of the hook. A cap 53 is provided over the upper end of the hollow shaft and from one side of this cap a small tube 54 is provided to convey the lubricant from the upper end of the hollow shaft to the hook raceway.

In the operation of the machine, the lubricant introduced into the reservoir 42, and which is preferably of a type specially suited for the lubrication of the hook raceway, is carried by the wicking 52 through its capillary action to the top of the hollow shaft. Even when the machine is at rest the lubricant will be carried up to this point. When the hook is rotated, however, the oil will be discharged by centrifugal force from the upper end of the wicking and will be thrown into the tube or passage 54 and carried to the hook raceway. As the lubricant is thus released at the top of the wicking, more will be automatically fed from the reservoir to this point of discharge. By the selection of wicking having the proper capillary qualities and by varying the compactness of the wicking in the shaft, the rate of flow of the lubricant from the reservoir to the raceway may be nicely regulated so as to provide the proper lubrication. The reservoir 42 need not be filled more than two or three times a day even when the machine is operated substantially continuously. Due to the inclusion of the reservoir directly in the hook saddle or frame, oil leakage is reduced to a minimum and the reservoir is adjusted with the hook in obtaining the desired spacing between two hook units.

As best shown in Fig. IV, the frame 20 of the unit 18 is of slightly different form from the frame 19. The cup 47a may be carried directly by the frame and the passage 46a may be formed directly within the frame in communication with the reservoir 42a. A removable plug 46b is provided at the free end of the passage 46a to facilitate manufacture and to permit cleaning and inspection. Each of the reservoirs 42 and 42a may be provided with a small vent opening 55 to prevent the system from becoming air-locked.

In Figs. VI and VII a slightly modified construction is illustrated. Here the reservoir is of somewhat greater capacity and positive means, readily accessible from the exterior, is provided for regulating the flow of the lubricant. This eliminates the necessity of extreme care in the selection of the wicking and in the maintenance of the same under uniform conditions. The hook frame 56 is adjustably mounted on the base of the machine by means of a screw 57 passing through an elongated slot in extension 58 of the hook frame and by means of a clamping screw 59, adapted to clamp a forked extension 60 upon a bearing sleeve 61. In general the rotary and non-rotary components of the hook are mounted and driven in the same manner as described in connection with Fig. V. However, the reservoir 62 is in a different angular position with relation to the hook axis than the reservoir 42 of Fig. V. It is shifted around to a position at about right angles to that of the reservoir 42. This permits filling of the reservoir through a cup 63 provided directly in its top. For purposes of inspecting and cleaning the reservoir, a removable end plate 64 is provided, this and a gasket 65 being attached by screws 66. At the bottom of the reservoir 62 a tube 67 is provided, this extending through an outer wall of the reservoir and into a passage 68 leading to the space 69 beneath the lower end of the hook shaft 33. Openings 70 are provided in tube 67 to admit the lubricant into the interior of the latter from the reservoir. An outlet passage 71 extends from the interior of the tube into the passage 68 and this outlet passage is adapted to be closed to a greater or less extent by a needle valve 72 adapted to be adjusted exteriorly of the reservoir by means of its screw-headed end 73. This construction and arrangement of the reservoir and the control valve is similar to that disclosed in the application of George Sauer, Ser. No. 436,554, filed March 28, 1942. For further details as to these and other features of the construction, reference may be had to said pending application.

The space 69 beneath the shaft 33, which together with the passage 68 forms an auxiliary reservoir, is preferably closed by a screw-threaded cap 74 cooperating with a screw-threaded extension 35a of the frame. A gasket 75 is provided to make a tight joint. Within the hollow shaft 33, wicking 76 is provided similar to the wicking 52 of Fig. V. The operation of this modified construction is the same as that of the Fig. V embodiment with the exception that a more positive and variable control of the flow of the lubricant from the reservoir to the hook raceway is brought about through the adjustable needle valve 72. In the normal operation of the machine, the auxiliary reservoir, formed by passage 68 and space 69, will be substantially empty since the wicking will feed the oil as rapidly as it is supplied through the needle valve. During a relatively long idle period, on the other hand, the auxiliary reservoir may become filled.

While several illustrative embodiments of the invention have been described in considerable detail, it will be understood that numerous variations may be made in each embodiment without departing from the general principles and scope of the invention. Features disclosed in connection with one embodiment may be employed in connection with the other. The invention is particularly adapted for use in machines having a plurality of vertical hooks but, as indicated, certain phases of the invention are applicable also to single hook machines. The terms and expressions used herein have been employed as terms of description and not of limitation.

I claim:

In a sewing machine having a frame member with a horizontally disposed work support, a vertical axis hook beneath said work support, said hook having rotary and non-rotary components with a raceway therebetween, a hollow shaft connected with said rotary component and extending downwardly therefrom, an auxiliary frame carrying said shaft, main and auxiliary lubricant reservoirs in said auxiliary frame with a passage connecting the same, said auxiliary reservoir extending beneath and receiving the lower end of said shaft, wicking in the bore of said hollow shaft adapted to elevate lubricant from said auxiliary reservoir to a point adjacent said hook for delivery by centrifugal action to said raceway, valve means cooperating with said passage for regulating the flow of lubricant from said main reservoir to said auxiliary reservoir, said valve means being capable of completely stopping said flow of lubricant, and a removable closure member for said auxiliary reservoir providing access to the lower end of said shaft for removal and replacement of said wicking.

NORMAN V. CHRISTENSEN.

REFERENCES CITED

The following references are of record in the file of this patent:

UNITED STATES PATENTS

| Number | Name | Date |
|---|---|---|
| 1,311,817 | Hohmann | July 29, 1919 |
| 1,936,372 | Waterman | Nov. 21, 1933 |
| 2,151,308 | Zonis | Mar. 21, 1939 |
| 2,248,508 | Myers | July 8, 1941 |
| 2,095,450 | Myers | Oct. 12, 1937 |
| 2,304,741 | Myers | Dec. 8, 1942 |
| 1,837,020 | Defibaugh | Dec. 15, 1931 |
| 1,999,978 | Myers | Apr. 30, 1935 |
| 1,766,264 | Small | June 24, 1930 |
| 2,030,611 | Schmidt | Feb. 11, 1936 |
| 2,334,644 | Parry | Nov. 16, 1943 |
| 2,370,930 | Batting | Mar. 6, 1945 |

FOREIGN PATENTS

| Number | Country | Date |
|---|---|---|
| 546,163 | Great Britain | 1942 |